(12) United States Patent
Lavian et al.

(10) Patent No.: US 6,950,932 B1
(45) Date of Patent: Sep. 27, 2005

(54) SECURITY ASSOCIATION MEDIATOR FOR JAVA-ENABLED DEVICES

(75) Inventors: Tal Lavian, Sunnyvale, CA (US); Franco Travostino, Arlington, MA (US); Thomas Hardjono, Arlington, MA (US); Rob Duncan, San Francisco, CA (US)

(73) Assignee: Nortel Networks Limited, (CA)

( * ) Notice: Subject to any disclaimer, the term of this patent is extended or adjusted under 35 U.S.C. 154(b) by 0 days.

(21) Appl. No.: 09/307,452

(22) Filed: May 7, 1999

(51) Int. Cl.$^7$ .......................... H04L 9/00; H04K 1/00; G06F 11/30; G06F 15/73; G06F 15/16
(52) U.S. Cl. .............. 713/151; 713/151; 713/155; 713/156; 713/165; 713/166; 713/176; 713/182; 713/200; 713/201; 709/223; 709/224; 709/225; 709/226; 709/227; 709/228; 709/229
(58) Field of Search ................. 713/200–201, 713/202, 151, 155, 156, 161, 165, 166, 176, 713/182; 709/223–226, 229; 717/108, 116, 717/117, 118, 148

(56) References Cited

U.S. PATENT DOCUMENTS 5,974,549 A * 10/1999 Golan
6,480,962 B1 * 11/2002 Touboul .................... 713/200
6,766,454 B1 * 7/2004 Riggins ..................... 713/185

OTHER PUBLICATIONS

Yerxa, Network Computing, 1998, n 904, p. 134.*
Bott, Online Security, Sep. 1196, v9, n9, p. 344(2).*
Gilliland, Can Encryption Protect Your Data, Dec. 1996, Databased Advisor, v14, n12, p. 84(4).*
Indermaur, Assessing Java for Electronic Commerce, 1998, v11, n2, p. 38(5).*
Kirtland, Safe Web Surfing with The Internet Component Download Service, 1996, Microsoft Systems, v11, n7, p. 65(7).*
Karve, Securing Java and ActiveX, 1998, Network, v13, n3, p. 67(4).*
Crotty, A Travel Guide To Component Software, 1997, MacWorld, v14, n3, p. 143(4).*
Leach, Norvin; Moeller, Michael, IE 3.0 Applets Will Earn Certification, Jul. 22, 1996, PC Week, v13, n29, p1(2).*
Gage, McLain's Crusade: Consultant Sets Out To Prove Technology's Faults, Computer Reseller News, 1996, n 701, p. 71.*
Mardesich and Gage, Developers waging all-out war for share of the Web, 1996, Computer Reseller News, 1996, n671, p. 1.*
Schneier, Applied Cryptography, 1996, 37-42.*

(Continued)

*Primary Examiner*—Ayaz Sheikh
*Assistant Examiner*—Jenise Jackson
(74) *Attorney, Agent, or Firm*—Steubing McGuinness & Manaras LLP

(57) ABSTRACT

The invention provides a system and method for providing security against unauthorized access to a java enabled network device. The system includes multiple conventional class loaders, code verifiers, security managers, access managers, SAMs, a certificate authority and a policy server. The SAM verifies the authenticity of the entity and either allows a download/access to a device or rejects the download/access to a network device. The certificate authority is a repository for public key certificates and may be a part of the secure network or part of the unsecured network. The policy server is a repository for the rights (privileges) an entity is entitled to on the secure network. The code verifiers verify that the Byte Code is valid java code. The security manager is the conventional security manager. The class loader loads the code to the device and the access manager assigns access levels to each Java thread that is created.

4 Claims, 2 Drawing Sheets

OTHER PUBLICATIONS

Virginia Tech Institute, 1996, 14 Java Security.*
Zhong, Security in the Large: is Java's Sandbox Scalable?, Apr. 1998, p. 1-8.*
Bank, 1995, Java Security, p. 1-11.*
Gaudin et al., Augus 19, 1996, Computer World.*
Schultz, Oct. 21, 1996, Network World, p. 46.*

* cited by examiner

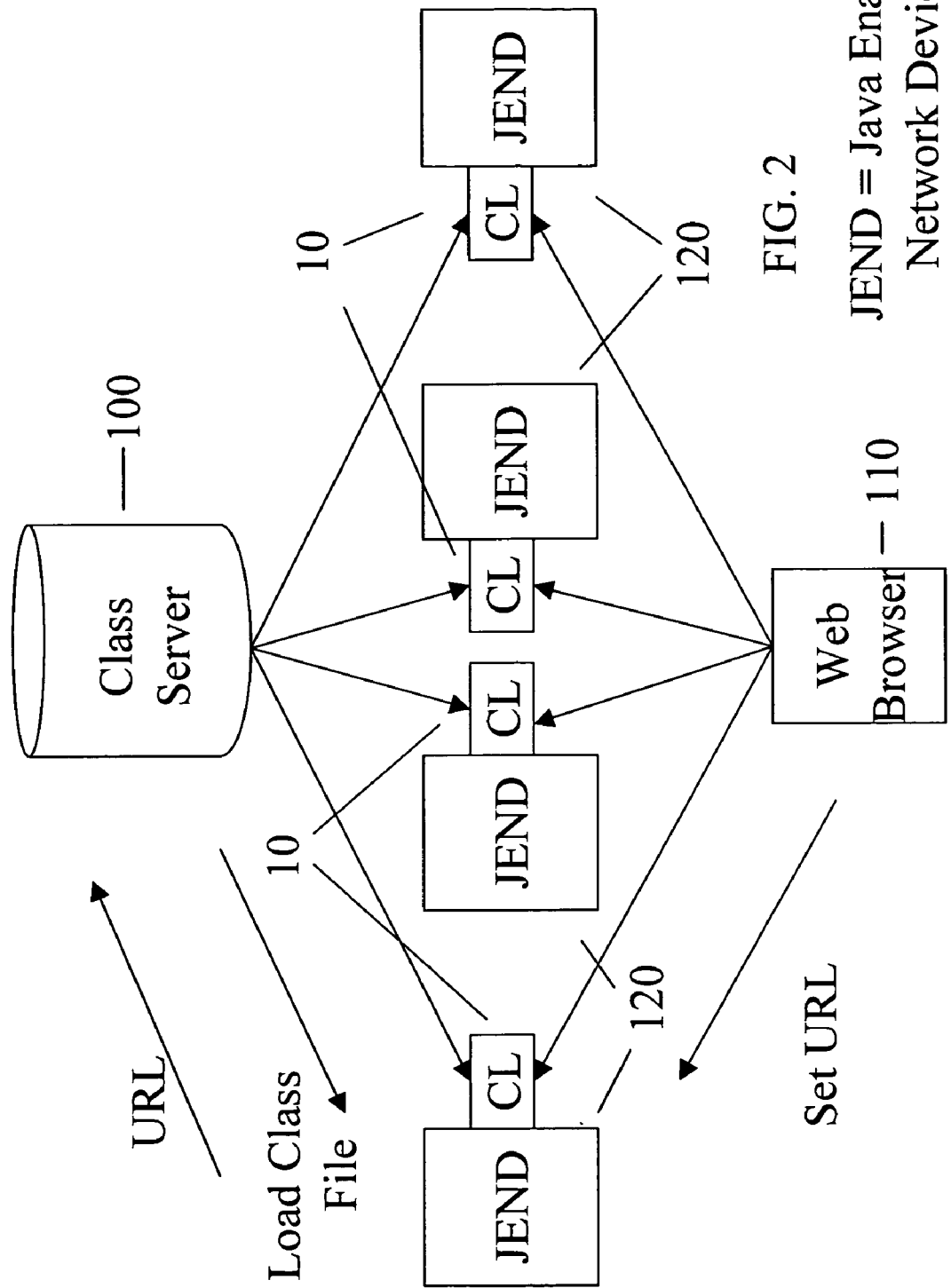

SECURITY ASSOCIATION MEDIATOR FOR JAVA-ENABLED DEVICES

FIELD OF THE INVENTION

This invention relates generally to the field of networking and more particularly to methods and apparatus for transferring files between devices in a secure manner.

BACKGROUND OF THE INVENTION

Data networks have become an essential part of most businesses. With the advent and wide acceptance of the Internet they have become even more essential.

Many network systems, such as telephone network products, data network products, etc. include externally developed software applications that call various functions within the network. It is desirable, however, to limit the functions and/or information that can be called by the application or the visitor to those that are necessary and/or approved.

It is thus important for a business to take precautions against downloading a code which may be potentially damaging to its network (e.g. a code which accesses the internal resources of a switch or router, such as the routing tables or filtering information, etc) and to take precautions against unauthorized access by outsiders.

It is unlikely that computers which access the Internet will ever be completely safe from attack from hackers and viruses. However, systems are available which provide a level of protection and security against such problems.

The Java environment includes security devices such as a security manager, a byte code verifier and a class loader. A security manager is a local device which determines whether potentially threatening or unauthorized operations should be allowed. A byte code verifier verifies the byte code transmitted with the download, and the class loader loads the Java Byte code to the JVM.

However, the security devices of a respective environment may not be backward compatible with earlier versions. In the Java environment, as an example, the security devices in version 1.2 are not backward compatible with those in versions 1.1 and 1.0.2, and the security devices in version 1.1 are not backwards compatible with those in version 1.0.2. Thus, an application program written in a respective version of Java is not compatible with other versions.

Furthermore, in some programming environments, such as in the Java environment, the security devices provide multi-level security but are not transparent, namely the user code must explicitly interact with the system, and the security devices are not dynamic, namely that off-line changes to the system may be necessary. Alternatively, the security devices are code transparent but do not provide multi-level security.

Accordingly, there exists a need for a security system which is system wide which prevents harmful programs from being downloaded onto a network.

There exists a need for a security system which is system wide and which prevents unauthorized access to the internal resources of a switch or router.

There also exists a need for such a system which enables a system view or configuration.

There also exists the need for such a system which is distributed.

There exists a need for such a system which allows other security entities to participate in the security system.

Accordingly, it is an object of the present invention to provide a security system which prevents harmful programs from being downloaded onto a network.

It is an object of the invention to provide a security system which prevents unauthorized access to the internal resources of a switch or router.

It is another object of the invention to provide such a system which is system wide and which enables a system view or configuration.

It is still another object of the invention to provide such a system which is distributed.

It is another object of the invention to provide a such a system which allows other security entities to participate in the security.

These and other objects of the invention will become apparent to those skilled in the art from the following description thereof.

SUMMARY OF THE INVENTION

In accordance with the teachings of the present invention, these and other objects may be accomplished by the present invention, which provides a method for providing security against unauthorized access to internal resources of a network device. The method includes receiving a digital signature at a security association manager (SAM) wherein the digital signature includes an encryption code. The SAM requests a de-encryption code, de-encrypts the digital signature with the de-encryption code, authenticates the de-encrypted digital signature, and requests allowed operations associated with the authenticated signature.

An embodiment of the invention includes apparatus for providing security against unauthorized access to internal resources of a network device. The apparatus includes a security association manager (SAM) configured to receive a digital signature including an encryption code. The SAM is configured to send a message including a portion of the digital signature. The message includes a request for an encryption decoder. The SAM is further configured to receive a response to the message. The SAM is also configured to send a digitally signed message requesting allowed operations associated with the digital signature in response to receiving the reply message.

Another embodiment of the invention includes apparatus for providing security against unauthorized access to internal resources of a network device. The apparatus includes a module for receiving a digital signature including an encryption code. It also includes a module for accessing a de-encryption code in electrical communication with the module for receiving; and, it includes a module for determining allowed operations associated with the digital signature.

BRIEF DESCRIPTION OF THE DRAWINGS

The invention will be more clearly understood by reference to the following detailed description of an exemplary embodiment in conjunction with the accompanying drawings, in which:

FIG. 2 illustrates a block diagram of a distributed security system in accordance with the present invention.

DETAILED DESCRIPTION OF THE INVENTION

Figure 1:
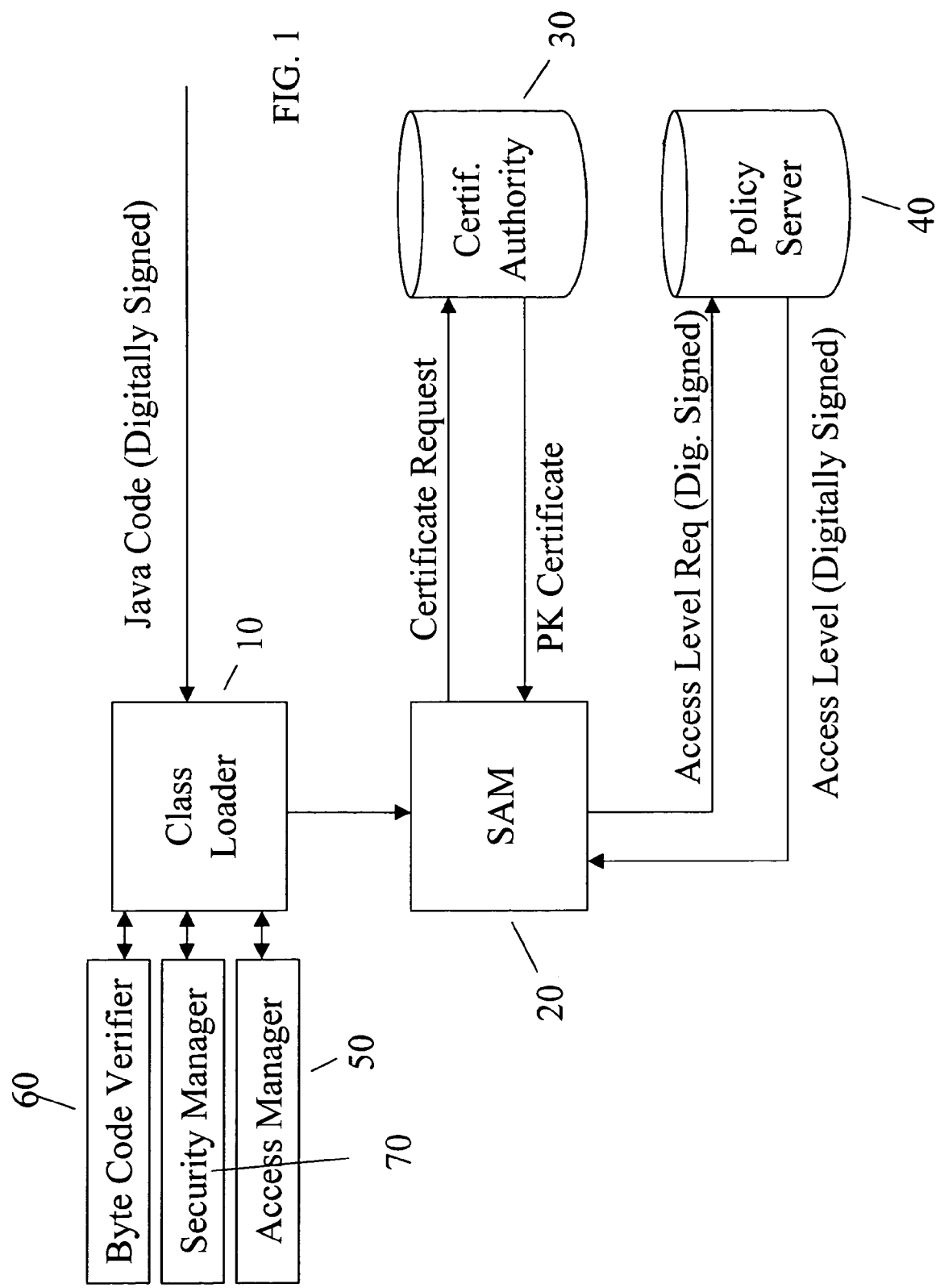
FIG. 1 illustrates a block diagram of a security system in accordance with the present invention.

The invention provides a system and method of providing network security while transferring Java code between devices and/or while allowing access to Java enabled devices (e.g., within a network, between devices on a network and the Internet, between devices on separate networks, between network devices and application servers, and/or between network devices and databases.).

As illustrated in FIG. 1, the system provides a Security Association Manager 20 (SAM) which performs, inter alia, certain security tasks which are not performed by conventional Java security systems. The SAM 20 is distributed throughout the network and may be part of the class loader 10. Those skilled in the art will recognize that the SAM 20 may be integral with the class loader 10, co-located with, but logically separate from the class loader 10 or entirely distinct therefrom and still fall within the scope of the invention. The SAM 20 may be realized in hardware and/or software. As illustrated in FIG. 1, the system includes conventional class loaders 10, SAMs 20, a certificate authority 30, a policy server 40, access managers 50, security managers 70 and byte code verifier 60. The SAM 20 verifies the authenticity of the entity and either allows a download/ access to a device or rejects the download/access to a network device. The certificate authority 30 is a repository for public key certificates and may be a part of the secure network or part of the unsecured network. The policy server 40 is a repository for the rights (privileges) an entity is entitled to on the secure network. The class loader 10 loads the Java Byte Code to the JVM. The Access Manager 50 assigns access levels to each Java thread that is created. The security manager 70 is a conventional security manager and the byte code verifier 60 verifies that the Byte code is valid Java code.

When Java code is to be transferred to a Java enabled network device (JEND) in the secure network, the code is digitally signed. A digital signature is generally a string of bits that is computed from a combination of the data being signed and a private key of an entity. A private key certificate (private key) is generally a number that is supposed to be known only to a particular entity, although it may not even be known to the entity (e.g. it may be associated with that entity through a program that entity employs). Either way, a private key is meant to be kept secret. A private key is always associated with a public key.

A digitally signed Java code is received by the class loader 10 and may be employed by the SAM 20, which is in communication with the class loader 10, to verify that the data came from an authorized entity or with the authority of an authorized entity. A digital signature can be authenticated via a computation that uses the public key corresponding to the private key used to generate the signature. It cannot be forged, assuming the private key is kept secret. It is a function of the data signed and thus can not be claimed to be the signature for other data as well. Further, the signed data cannot be changed; if it is, the signature will no longer authenticate.

The SAM 20 receives the digital signature, reads a name or code which is attached thereto then sends a request (including the name/code which was attached to the digital signature) for the public key certificate to the certificate authority 30. The certificate authority 30 compares the received request to the information stored therein. If no match is found then the certificate authority 30 responds to the SAM 20 with a message indicating failure (e.g., certificate does not exist, etc.). If the certificate authority finds a match, then it returns the public key certificate to the SAM 20.

If the SAM receives the failure notification it rejects the download/denies access. If the SAM receives the public key certificate, it authenticates the digital signature using the public key.

After the SAM 20 authenticates the digital signature, it sends a request for the rights the entity has on the secure network. The request is digitally signed or encrypted and sent to the policy server 40. While in the preferred embodiment the request to the policy server is digitally signed, it is possible to use other forms of security or no security at all if so desired, since the request typically will occur over the secure network and all SAMs could have the same rights to see the requested information. In the preferred embodiment the request is encoded since generally not all SAMs have the same rights on the network. The policy server 40 verifies the authenticity of the request from the SAM 20, then returns the access level stored in the policy server 40 corresponding to the request. The response is also digitally signed or encrypted to prevent it from being modified during transit. However, since this is also traveling over the secured network it is foreseeable that this message could be designed to have no security attached to it. Once the SAM receives this information and authenticates the transmission, it allows the download of the code/access to the system to take place within the limits of the entity's rights on the network.

The operation of the SAM with respect to providing further access is described in further detail in U.S. application Ser. No. 09/307,523, filed May 7, 1999, and now issued as U.S. Pat. No. 6,564,325, which is incorporated herein by reference.

It will thus be seen that the invention efficiently attains the objects set forth above, among those made apparent from the preceding description. In particular, the invention provides methods and apparatus for providing network security against unauthorized access to Java enabled devices. Those skilled in the art will appreciate that the configuration depicted in FIGS. 1 and 2 provide such features.

It will be understood that changes may be made in the above construction and in the foregoing sequences of operation without departing from the scope of the invention. It is accordingly intended that all matter contained in the above description or shown in the accompanying drawings be interpreted as illustrative rather than in a limiting sense.

It is also to be understood that the following claims are intended to cover all of the generic and specific features of the invention as described herein, and all statements of the scope of the invention which, as a matter of language, might be said to fall there between.

Having described the invention, what is claimed as new and secured by Letters Patent is:

1. A method of providing security against unauthorized access to internal resources of a network device comprising;
   receiving a digital signature at a security association manager (SAM);
   said SAM requesting a de-encryption code;
   said SAM de-encrypting said digital signature with said de-encryption code;
   said SAM authenticating said de-encrypted digital signature;
   said SAM requesting allowed operations associated with said authenticated signature;
   a policy server receiving said request for allowed operations associated with said authenticated signature;
   said policy server comparing said authenticated signature with information stored on said policy server; and
   said policy server sending a response to said SAM indicating an access level corresponding to said authenticated signature.

2. A method of providing security according to claim 1 further comprising:
   said policy server authenticating said request for allowed operations associated with said authenticated signature prior to comparing said authenticated signature with said information stored on said policy server.

3. Apparatus for providing security against unauthorized access to internal resources of a network device comprising:
- means, within a security association manager, for receiving a digital signature;
- means, within said security association manager, for accessing a de-encryption code associated with said digital signature, and for decrypting and authenticating said digital signature; and
- means, within a policy server, for receiving a request for allowed operations associated with said authenticated digital signature policy server; and
- means, within said policy server, responsive to said request, and to a comparison of said authenticated digital signature with information within said policy server, for determining an access level for a java thread associated with said digital signature, and for sending an indication of said access level in a response to said security association manager.

4. Apparatus for providing security against unauthorized access to internal resources of a network device comprising:
- a security association manager (SAM) configured to receive a digital signature;
- wherein said SAM is configured to send a message including a portion of said digital signature;
- wherein said message includes a request for an encryption decoder;
- wherein said SAM is further configured to receive a response to said message; and
- wherein said SAM is configured to send a digitally signed message requesting an access level for program code associated with said digital signature, in response to receiving said response message;
- a policy server configured to receive said request for allowed operations associated with said authenticated signature;
- said policy server including a comparison device configured to compare said authenticated signature with information stored on said policy server; and
- said policy server being configured to send a response to said SAM indicating an access level corresponding to said authenticated signature.

* * * * *